United States Patent Office 2,725,816
Patented Dec. 6, 1955

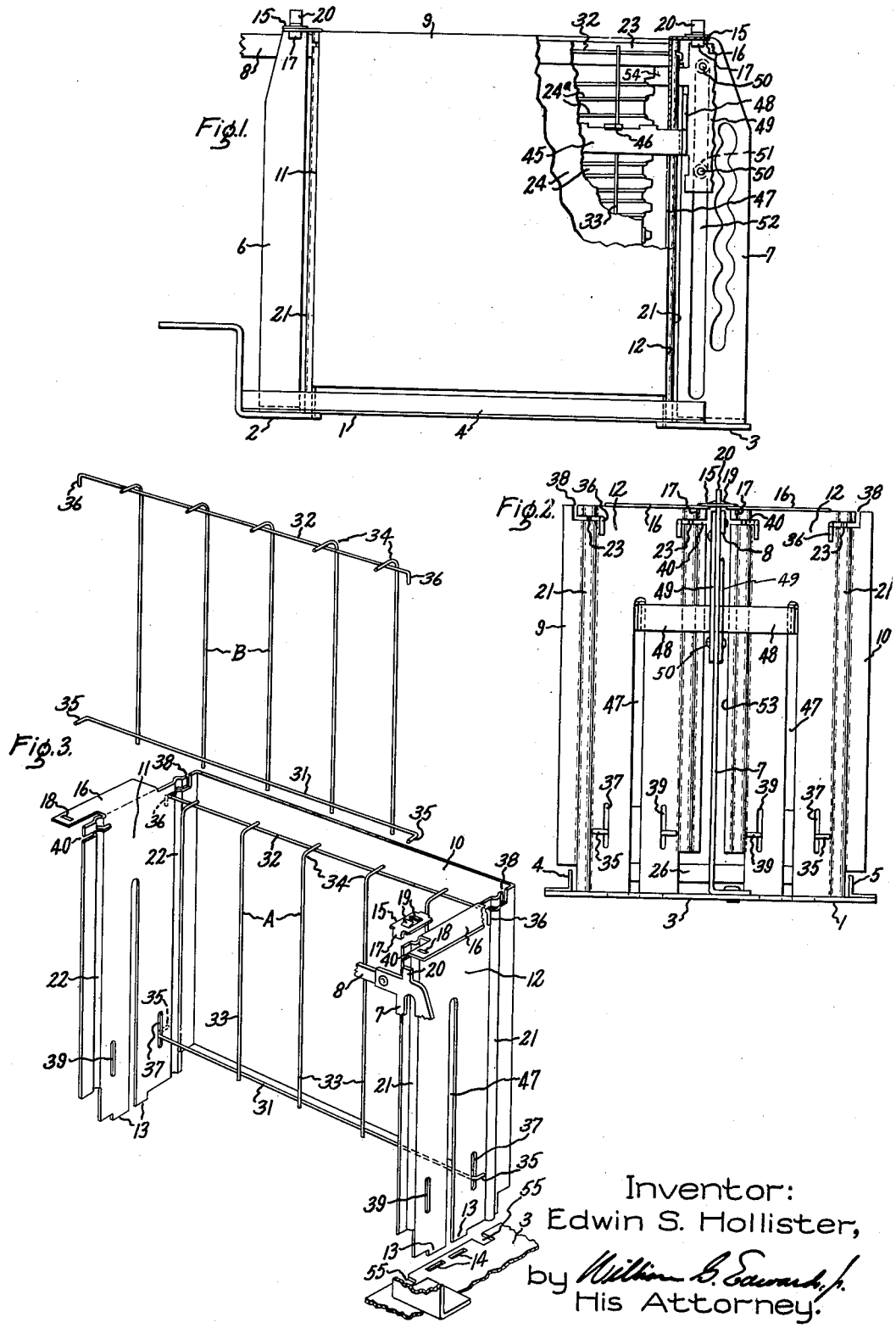

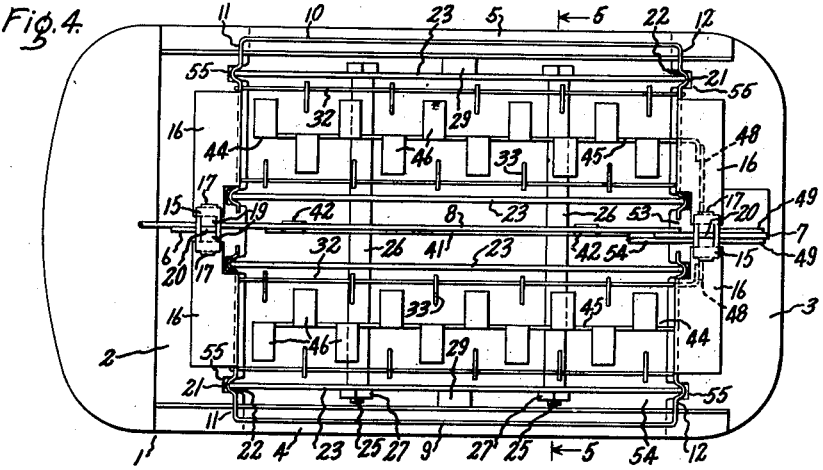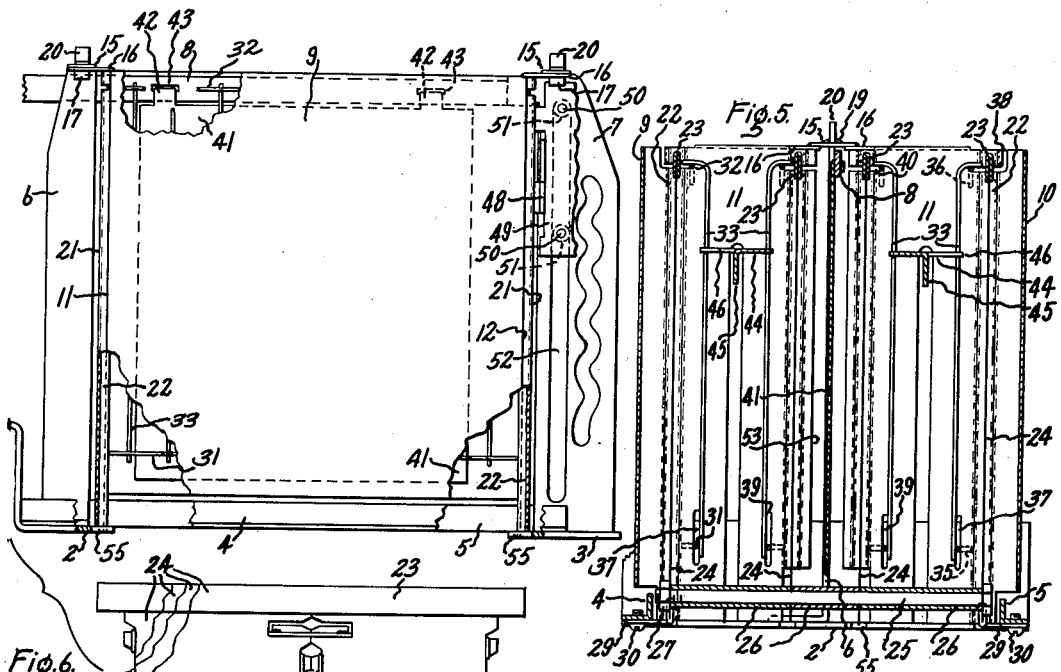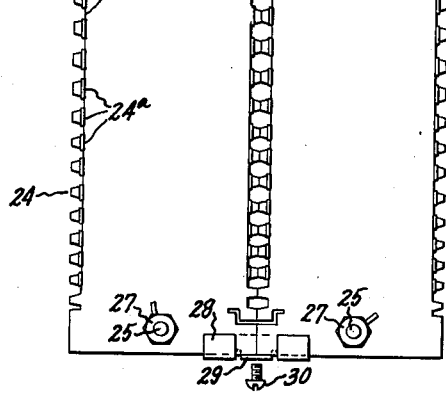

2,725,816

TOASTING CHAMBER STRUCTURE FOR ELECTRIC TOASTERS

Edwin S. Hollister, Allentown, Pa., assignor to General Electric Company, a corporation of New York Application October 5, 1951, Serial No. 249,963

5 Claims. (Cl. 99—401)

In electric toasters such as "pop-up" or automatic toasters for example, there is provided inside the outer casing or shell a structure comprising sheet metal side and end walls which define the toasting chamber and which serve as heat reflectors; and in the toasting chamber are positioned the electric heating units and the guard wires, the guard wires defining the space for receiving the bread slice to be toasted and serving to position it with respect to the heating units. The present invention has to do with such toasting chamber structures including the structure and arrangement of the side and end reflector walls and the guard wires.

The object of the invention is to provide an improved device of the type referred to which is simple in structure and capable of being manufactured and assembled at low cost.

According to the invention, the toasting chamber is defined by sheet metal side walls having inturned flanges which define the end walls and the heating units and guard wires are carried by such flanges, the guard wires being in the form of unitary grids supported in openings in such end flanges.

For a consideration of what I believe to be novel and my invention, attention is directed to the following specification and to the claims appended thereto.

In the drawing Fig. 1 is a side view with parts broken away of a toaster structure embodying my invention; Fig. 2 is an end view of the structure shown in Fig. 1; Fig. 3 is an exploded perspective view of a part of the structure; Fig. 4 is a top plan view; Fig. 5 is a sectional view taken on line 5—5, Fig. 4, looking in the direction of the arrows, and Fig. 6 is a side view of the toaster and the heating unit structure illustrating the manner in which they are assembled.

The invention is especially well adapted for use in a toaster for toasting simultaneously two slices of bread and is herein illustrated and described as being embodied in such a toaster. It is to be understood, however, especially as to certain features, that the invention may be utilized in toasters for toasting simultaneously either fewer or more than two slices.

Referring to the drawing 1 indicates a rectangular metal base which forms a support for the toaster mechanism. It comprises front and rear end plates 2 and 3 to which are connected side angles 4 and 5. Fixed at their lower ends on end plates 2 and 3 are vertical guide posts 6 and 7 which at their upper ends are connected together by a crossbar 8.

Posts 6 and 7 and crossbar 8 together form a rigid frame carried by base 1. They are shown in the present instance as being formed from flat sheet stock. As shown in Fig. 4 they are positioned midway between the side edges of base 1.

The toasting chamber is defined by side walls 9 and 10 each provided with turned-in flanges 11 and 12 which form the end walls. Each side wall with its in-turned flanges may be termed a reflector unit, there being a reflector unit in connection with each toasting space.

Each reflector unit is positioned on base 1 by tongues 13 at the lower edges of end flanges 11 and 12 which fit into openings 14 in end plates 2 and 3 (Fig. 3). It is held at its upper end by fasteners 15 on the upper ends of posts 6 and 7. The ends of fasteners 15 overlie outturned flanges 16 at the top edges of end wall flanges 11 and 12 and have downwardly extending tongues 17 located in openings 18 in flanges 16. Fasteners 15 may be in the form of rectangular clips having tongues 19 which frictionally engage upstanding ears 20 on the upper edges of posts 6 and 7. With this arrangement the reflector units may be quickly and easily attached to the base and frame by positioning tongues 13 in openings 14 and then pressing fasteners 15 down onto ears 20, the tongues 17 being guided into openings 18. Or, fasteners 15 may be first pressed down onto ears 20 and the reflector units then mounted, flanges 16 having resiliency sufficient to permit of their being bent down enough to engage openings 18 with down-turned tongues 17.

Flanges 11 and 12 are provided with outwardly projecting longitudinally extending beads 21 which provide opposed inwardly facing grooves 22 in which the outer ends of top bars 23 of the toaster heating units 24 are held. The toaster heating units may be of any known or suitable type. Their specific construction forms no part of the present invention. They may comprise for example, suitable mica sheets on which resistance wire 24a is wound, the upper ends of the mica sheets being stiffened by the top bars 23. Four heating units are provided, a pair for each toasting space. One pair is held in the opposed grooves 22 of each reflector unit as is shown clearly in Fig. 4. The toaster heating units are fastened together at their lower ends and are carried by bolts 25 which serve also as connector buses for the resistance wires in a known manner. They are spaced on the bolts by spacing sleeves 26 and are held by end nuts 27 threaded on the ends of the bolts. The four heating units 24 held by bolts 25 form a unitary structure which may be handled and assembled in the toasting chamber as a unit. This unitary structure is held at its upper end by the ends of top bars 23 which are in grooves 22. It is held at its lower end by clips 28 which are clamped to the lower edges of the outside heating units at their central portions and have ears 29 which are fastened to side angles 4 and 5 by screws 30.

Carried by the end flanges 11 and 12 of each reflector unit is a pair of spaced wire guard grids which are located in front of the heating units and serve to define the space for the bread slices. Each grid comprises a bottom wire 31 and a top wire 32 connected by vertical wires 33. The upper ends of wires 33 are bent at right angles and the angular portions are connected to wires 32 adjacent their ends. The bends are curved as indicated at 34 so that the upper ends of the pair of grids which define the opening for the reception of a bread slice present nicely rounded surfaces for directing a bread slice into the toasting space. The lower ends of wires 33 are connected directly to wire 31. The wires may be connected together by welding, brazing or any other suitable means. Preferably they are united by welding. The ends of wire 31 are bent outwardly at right angles to the plane of the grid to provide fastening ends 35 and the ends of wire 32 are bent downwardly at right angles in a plane parallel to the plane of the grid to provide fastening ends 36.

Referring particularly to Fig. 3, the two wire guard grids of each reflector unit may be termed, for convenience in describing them, as a rear grid A and a front grid B. They are alike in structure. The rear grid A is supported at its lower end in two opposed elongated slots 37 in end flanges 11 and 12, the ends 35 engaging the outer surfaces of flanges 11 and 12; its upper end is supported in right angular notches 38, the vertical legs of which extend to the top edges of flanges 11 and 12 and the horizontal legs to a point beyond beads 21, ends 36 being locked behind the beads. The front grid B is supported at its lower end in two opposed elongated slots 39 in end flanges 11 and 12, the ends 35 engaging the outer surfaces of flanges 11 and 12; its upper end is supported in notches 40 which extend to points beyond beads 21, ends 36 being locked behind the beads.

An advantage of the structure is the ease with which the two grids may be assembled into a reflector unit. The grid A may be assembled by holding it at right angles to the side wall of the reflector unit with ends 35 pointing toward the top of the unit and positioning the ends in slots 37, an end being passed through one slot, the grid then moved sidewise so the other end can be brought in line with its slot and then moved sidewise in the other direction to pass the other end through its slot. Following this the grid can be moved to bring the ends of the wire 31 to the tops of slots 37 and the end grid swung to pass wire 32 over the tops of the end flanges into line with notches 38, slots 37 being of sufficient length to permit this operation. The wire can then be passed down into the notches and moved to bring ends 36 behind beads 21. Grid B can be assembled on the reflector unit in a similar manner, ends 35 being positioned in slots 39 but pointing downwardly and the grid turned to bring wire 32 into notches 40 with ends 36 locked behind beads 21.

In assembling the mechanism, the grids are first assembled on the reflector units after which the reflector units with the grids thereon are mounted on base 1. After the reflector units are mounted on the base the grids are firmly locked on the end flanges and as shown in Fig. 2. after the heating units are assembled into the structures top bars 23 further prevent the grids from moving out of notches 38 and 40.

Located between the two bread slice spaces is a heat reflecting wall 41 which is common to the two spaces and forms their inner walls. It is hung on cross bar 8 by hooks 42 positioned in slots 43 in bar 8.

In each bread slice space is a bread rack 44 comprising a bar 45 having angularly extending supporting fingers 46. The rear ends of bars 45 extend through slots 47 in end flanges 12 and the ends are connected to the outer ends of wings 48 on vertically movable guide plates 49 as best shown in Fig. 2.

The guide plates 49 are positioned one on each side of post 7. They are connected together by vertically spaced rivets 50 on which are rollers 51 which ride in a longitudinal slot 52 in post 7. Bread racks 44, wings 48 and plates 49 form a unitary rigid carriage which slides vertically with respect to and which is guided in its movements by the post 7 and by the rollers 51 which ride down and up in slot 52.

As is understood in connection with toasters of this type, bread racks 44 are arranged to have two positions, an upper non-toasting position and a lower toasting position. The carriage normally stands in its upper non-toasting position. When toast is to be made the bread slices are placed on the racks and the carriage is lowered to its toasting position where it is held until the bread is toasted after which it is returned to non-toasting position. Insofar as the present invention is concerned the carriage may be lowered, held in lowered position and then raised again by any suitable means, either manual, automatic or a combination of the two. A feature of the present invention, however, is the arrangement of the two reflector units on the base so that the vertical edges of flanges 11 and 12 of the opposed units are spaced apart to provide vertically extending gaps 53 for the passage of carriage operating arms, levers or other suitable means from the back to the front of the toaster. This is indicated by the arm 54 formed integral with one of the guide plates 49 and extending forwardly through the one gap 53. In connection with this invention there may be used, for example, operating mechanism such as that disclosed in my application Serial No. 249,962, filed of even date herewith and assigned to the same assignee as the instant application.

The construction is such that the four toaster heating units may be assembled in the frame as a unit after the reflector units with the grids mounted therein have been fixed in place on base 1. To this end the opening defined by end plates 2 and 3 and side angles 4 and 5 is of a size to define a rectangular opening large enough to permit the assembled heating units being passed through it. The flanges 11 and 12 of the reflector units are lined up with the inner edges of end plates 2 and 3 and the end plates are provided with cut-out portions 55 to expose the lower ends of grooves 22. With this arrangement, as will be clear from Fig. 6, the assembled heating unit structure may be inserted into place within the reflector units from the bottom and fastened by the screws 30. This arrangement permits of ready removal of the heating units for repair or replacement without dismantling operating mechanism of the toaster.

My invention is characterized by the simplicity of the structure and the ease with which the several parts may be made and assembled, enabling the structure to be manufactured at low cost. The two reflector units which define the toasting chamber are alike and may be formed by a stamping operation. The grids may be made readily on automatic machinery and are quickly and easily mounted on the reflector units and locked in place behind beads 21; and the reflector units with the grids assembled thereon are readily attached to the base 1 after the manner already explained, grooves 22 aligning with cut-out portions 55. This forms a rigid structure ready to receive the unitary heating structure. This structure is slid into place through the opening defined by end plates 2 and 3 and side angles 4 and 5, the ends of bars 23 being guided by grooves 22; and when in place the screws 30 are inserted to fasten it. It will be noted that for the complete structure the only separate fastening means are the two fasteners 15 for the upper ends of the reflector units and the two screws 30 for the heating unit structure. The beads 21 perform the double function of a guide and holding means for the heating units and a locking means for the wire grids.

What I claim as new and desire to secure by Letters Patent of the United States is:

1. A toaster structure comprising a base having end and side members which define a rectangular frame, end posts supported substantially intermediately on the end members, means supported on the base which defines a toasting chamber, said means comprising opposed side walls provided with end flanges which form the end walls, means for positioning the end flanges on said base, interengaging means fastening the end flanges to said posts, said end flanges being provided with vertically extending beads which define opposed inwardly facing grooves, toaster heating units having parts held in said grooves and parts attached to the base, said heating units being positioned to define toasting spaces, and unitary wire grids in said toasting spaces for positioning bread slices therein, said wire grids being carried by said end flanges.

2. A toaster structure comprising a base having end and side members which define a rectangular frame, end posts supported substantially intermediately on the end members, means supported on the base which defines a toasting chamber, said means comprising opposed side walls provided with end flanges which form the end walls, means between the lower edges of said flanges and the end base members for positioning the lower ends of the flanges on such members, clips fastening the upper ends of said flanges to said posts, vertically extending beads on said end flanges which define opposed inwardly facing grooves, toaster heating units having parts held in said grooves and parts attached to the base, said heating units being positioned to define toasting spaces, and unitary wire grids in said toasting spaces for positioning bread slices therein, said wire grids being carried by said end flanges.

3. A toaster structure as defined in claim 1 wherein the edges of the end flanges which form each end wall are spaced apart to define gaps for the passage of toaster operating parts.

4. For use in a toaster, a structure comprising a generally channel-shaped member and a wire grid, said member comprising a flat central portion having flanges formed at its sides that extend in parallel planes that are perpendicular to the plane of said portion, each of said flanges having an elongated bead formed on its side that faces away from the other flange, the axis of said bead extending in a plane that is parallel to the plane of said portion, a slot in each flange positioned near one end of the bead, a notch in each flange positioned at the other end of the bead, a portion of each notch extending through its respective bead and terminating immediately adjacent thereto, said grid formed of a first elongated wire, a parallel second elongated wire, and a plurality of spaced cross wires which are attached to said first and said second wires, the ends of said first wire being bent into a plane transverse to that of the grid, the ends of said second wire being bent towards said first wire into the plane of the bent ends of said first wire, said grid being proportioned relative to said channel-shaped member so that when assembled, the bent ends of said first wire extend through said slots and contact the sides of said flanges that have the beads formed thereon, and the bent ends of said second wire extend through said notches, contact the side of said flanges that have the beads formed thereon, and are disposed parallel and adjacent to said beads, the entire grid being locked thereby in assembled position.

5. A toaster comprising a base and a toasting chamber mounted thereon, said chamber being formed by two, spaced apart, side walls having integral, end flanges which oppose each other to form the end walls of said chamber, posts supported by said base, fastening means connecting said flanges to said posts, vertical beads formed in the end walls, which define opposed inwardly facing grooves, heating units mounted in said chamber and having parts held in said grooves, said heating units being positioned to define toasting spaces, unitary wire grids mounted in said toasting spaces for positioning bread slices therein, each end wall having a slot near the lower end of its bead and a notch near the upper end thereof, each of said notches having a portion that extends through its associated bead, said wire grids comprising a central portion and a pair of parallel, vertically spaced wires extending away from said central portion at each side thereof, the lower wires having their ends bent into a plane transverse to that of the central portion and the upper wires having their ends bent toward said lower wires into the plane of the bent ends of said lower wires, said grid being proportioned relative to said chamber so that the bent ends of the lower wires extend through said slots and contact the outer sides of said end walls, and the bent ends of said upper wires extend through said notches, contact the outer sides of said end walls and are disposed parallel and adjacent to said beads, the entire grid being locked thereby in assembled position.

References Cited in the file of this patent
UNITED STATES PATENTS

| | | |
|---|---|---|
| Re. 23,439 | Young | Dec. 11, 1951 |
| 706,502 | Van Wie | Aug. 5, 1902 |
| 1,522,818 | Grouleff et al. | Jan. 13, 1925 |
| 1,687,712 | Chandler | Oct. 16, 1928 |
| 1,720,800 | Morrison | July 16, 1929 |
| 1,748,741 | Tanaki | Feb. 25, 1930 |
| 1,893,989 | Galer | Jan. 10, 1933 |
| 1,919,559 | Johnson | July 25, 1933 |
| 1,963,924 | Smith | June 19, 1934 |
| 1,988,230 | Avery | Jan. 15, 1935 |
| 2,106,824 | Bayne | Feb. 1, 1938 |
| 2,195,638 | Anderson | Apr. 2, 1940 |
| 2,379,709 | Heilman | July 3, 1945 |
| 2,412,727 | Gomersall et al. | Dec. 17, 1946 |
| 2,414,082 | Barclay | Jan. 14, 1947 |
| 2,439,017 | Meyers | Apr. 6, 1948 |
| 2,537,408 | Hansen | Jan. 9, 1951 |
| 2,542,231 | Campbell | Feb. 20, 1951 |
| 2,567,075 | Lindberg | Sept. 4, 1951 |